(12) United States Patent
Kim et al.

(10) Patent No.: US 12,269,696 B2
(45) Date of Patent: Apr. 8, 2025

(54) MOBILITY AND APPARATUS FOR LOADING AND UNLOADING CARGO

(71) Applicants: Hyundai Motor Company, Seoul (KR); Kia Corporation, Seoul (KR)

(72) Inventors: Kye Yoon Kim, Gyeonggi-do (KR); Ji A Lee, Seoul (KR); Ji Min Han, Gyeonggi-do (KR); Ki Seok Sung, Gyeonggi-do (KR); Jong Kyu Choi, Gyeonggi-do (KR); Young Jun Byun, Seoul (KR); Jong Min Oh, Gyeonggi-do (KR); Jae Hoon Chung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 358 days.

(21) Appl. No.: 17/838,510

(22) Filed: Jun. 13, 2022

(65) Prior Publication Data

US 2023/0227274 A1   Jul. 20, 2023

(30) Foreign Application Priority Data

Jan. 17, 2022  (KR) .......................... 10-2022-0006721

(51) Int. Cl.
 *B65G 47/96* (2006.01)
 *B65G 67/04* (2006.01)
 *B65G 67/26* (2006.01)

(52) U.S. Cl.
 CPC ............. *B65G 47/96* (2013.01); *B65G 67/04* (2013.01); *B65G 67/26* (2013.01); *B65G 2814/0301* (2013.01)

(58) Field of Classification Search
 CPC .............................. B65G 67/04; B65G 67/26; B65G 2814/0301; B65G 47/96; B60P 1/006; B60P 1/02; B60P 1/04; B60P 1/045; B60P 1/28; B60P 1/283; B60P 1/44; B60P 1/4407; B60P 1/4414; B60P 1/4428; B60P 1/4471; B60P 1/4478; B60P 1/4492; B60P 1/0435
 USPC ........................................................ 414/555
 See application file for complete search history.

(56) References Cited

U.S. PATENT DOCUMENTS

| 5,749,630 | A  | * | 5/1998  | Ung ....................... B60P 1/165 |
|           |    |   |         | 105/260 |
| 10,689,194 | B2 |   | 6/2020  | Borders et al. |
| 2020/0207546 | A1 | * | 7/2020  | Borders ................ B65G 67/02 |
| 2021/0284450 | A1 | * | 9/2021  | Wang ....................... B64F 1/32 |
| 2022/0324644 | A1 | * | 10/2022 | Bao ...................... B65G 1/0435 |
| 2022/0363476 | A1 | * | 11/2022 | Iwata ..................... A01F 12/46 |

(Continued)

FOREIGN PATENT DOCUMENTS

| JP | 2021-098609 A | 7/2021 |
| JP | 2021-116140 A | 8/2021 |
| KR | 102111536 B1 | 5/2020 |

(Continued)

*Primary Examiner* — Glenn F Myers
(74) *Attorney, Agent, or Firm* — Fox Rothschild LLP

(57) ABSTRACT

The present disclosure relates to a mobility capable of automating loading and unloading of a cargo without the aid of manpower and an apparatus for loading and unloading a cargo. The mobility includes a cargo hold that accommodates a cargo; and a loading plate positioned to be spaced apart from a bottom of the cargo hold and installed so as to be able to tilt toward any one side of the mobility in the cargo hold.

18 Claims, 14 Drawing Sheets

(56) References Cited

U.S. PATENT DOCUMENTS

2023/0051182 A1*  2/2023  Lee ........................ H01L 31/18

FOREIGN PATENT DOCUMENTS

| KR | 2020-0119401 A | 10/2020 |
| KR | 102274498 B1 | 7/2021 |

* cited by examiner

MOBILITY AND APPARATUS FOR LOADING AND UNLOADING CARGO

CROSS-REFERENCE TO RELATED APPLICATION(S)

This application claims, under 35 U.S.C. § 119(a), the benefit of Korean Patent Application No. 10-2022-0006721, filed on Jan. 17, 2022 in the Korean Intellectual Property Office, the disclosure of which is incorporated herein by reference in its entirety.

BACKGROUND

Technical Field

Embodiments of the present disclosure relate to a mobility capable of automating loading and unloading of a cargo without the aid of manpower and an apparatus for loading and unloading a cargo.

Description of the Related Art

Various methods of transporting cargoes using aircraft have been proposed. For example, along with drones for transporting small cargoes, a cargo unmanned aerial system (CUAS) for transporting medium-sized cargoes is being developed. In order to transport cargoes with such an aircraft, it should be possible to safely and conveniently load and unload the cargoes through a cargo hold of the aircraft.

In order to reduce the labor of loading and unloading by manpower, U.S. Patent Publication No. US 2018/0155142 discloses a technology of loading goods using a cable robot and a conveyor. Since this technology requires a lot of equipment, the technology is suitable for loading large amounts of goods on transportation vehicles, such as trucks, but does not seem easy to apply to unmanned aerial vehicles.

As such, unlike the development of aviation technology, the development of an apparatus for loading and unloading a cargo in an aircraft is very slow. Accordingly, there is still a need for the development of an apparatus capable of automatically and efficiently loading and unloading cargo in an aircraft.

SUMMARY

Embodiments of the present disclosure may provide a mobility configured to automate loading and unloading of a cargo without the aid of manpower, and an apparatus for loading and unloading a cargo.

According to an exemplary embodiment of the present disclosure, a mobility may include a cargo hold that accommodates a cargo, and a loading plate positioned to be spaced apart from a bottom of the cargo hold and installed so as to be able to tilt toward any one side of the mobility in the cargo hold.

At least one tilting driver tilting the loading plate may be installed between the loading plate and the bottom of the cargo hold.

A pivoting member, extending in a height direction of the cargo hold, or a rotation shaft extending in a longitudinal direction of the cargo hold, may be installed below a center of the loading plate in a width direction, and the loading plate may be tilted about the pivoting member or the rotation shaft.

A plurality of guides supporting a package unit on which the cargo is placed and guiding the package unit to move in a width direction of the loading plate may be formed on an upper surface of the loading plate, and an inclined surface, inclined with respect to the width direction of the loading plate, may be provided on at least one side surface of each guide, and a groove portion widened toward a door of the cargo hold and gradually narrowed on an opposite side may be formed between the guides adjacent to each other by the inclined surface.

The package unit may include a container accommodating the cargo, or a tray on which the cargo is fixedly placed, and the package unit may be standardized.

A plurality of guide grooves may be formed on a bottom surface of the package unit to accommodate the guide of the loading plate and guide the package unit to move linearly along the guide on the loading plate.

The bottom surface of the package unit may be provided with at least one protrusion formed to be insertable between a pair of adjacent guides, and the protrusion, or an extension extending from the protrusion, may be provided with a fastening hole, and the fastening hole may be fastened with an operation rod of a fastener installed on at least one of the pair of guides.

A plurality of ball transfers may be at least partially mounted on a bottom surface of the package unit.

The loading plate may be provided in plural in the cargo hold, and the plurality of loading plates may be arranged in two rows in the cargo hold, and the cargo hold may be approached from both sides of the mobility in a width direction.

According to another exemplary embodiment of the present disclosure, an apparatus for loading and unloading a cargo may include the loading plate of the mobility described above, and a transport robot that is travelable and has a pusher configured to push the cargo positioned on a top plate of the transport robot to the loading plate.

A plurality of guide rails may be formed on the top plate of the transport robot to support a package unit on which the cargo is placed and guide the package unit to move in a longitudinal direction of the transport robot, and at one end portion of each guide rail, an inclined surface may be formed on at least one side surface of the guide rail, and a region between the inclined surfaces may be formed to be widened toward the cargo hold and gradually narrowed on an opposite side.

A plurality of guide grooves may be formed on a bottom surface of the package unit which are configured to guide the package unit to linearly move on the loading plate and the top plate of the transport robot.

The transport robot may further include a distance alignment unit configured to sense a distance between the transport robot and the mobility to reduce a distance from the cargo hold to a minimum distance, and the transport robot may be configured to move in a width direction of the mobility until a proximity sensor of the distance alignment unit detects the mobility.

The transport robot may further include a positioning unit configured for aligning a position of the transport robot with respect to the cargo hold so that the top plate of the transport robot and the cargo hold are aligned, a side surface of the mobility may be provided with a reaction member configured for position detection, and the transport robot may be configured to move in a longitudinal direction of the mobility until a position sensor of the positioning unit detects the reaction member.

The transport robot may further include a plurality of elevators configured to raise and lower the transport robot for height alignment with one end of the loading plate. Each elevator may be provided with an expandable operation rod, and a sensor unit may be installed at an edge of the top plate, and a reaction member may be mounted at one end of the loading plate,. When the transport robot is raised and lowered by the operation of the elevator, if the sensor unit detects the reaction member, the elevator is configured to stop an operation of the elevator.

The pusher may include a pusher head whose one side is in direct contact with the package unit on which the cargo is placed, and a pusher driver that is connected to another side of the pusher head to provide a driving force, and the one side of the pusher head may be provided with a cushioning material formed of an elastic material.

A stopper configured to control an operation of the pusher may be installed on the top plate.

The transport robot may include a base portion, the top plate that is raised and lowered on the base portion, and a lifter that is interposed between the base portion and the top plate and is configured to raise and lower the top plate.

A sensor unit may be installed at an edge of the top plate, and a reaction member may be mounted at one end of the loading plate, and, when the top plate is raised by the operation of the lifter, if the sensor unit detects the reaction member, the lifter may be configured to stop an operation of the lifter.

The loading plate may be provided in plural in the cargo hold, and the transport robot may be provided in plural, and the plurality of transport robots may have different operation start positions or operation start times.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
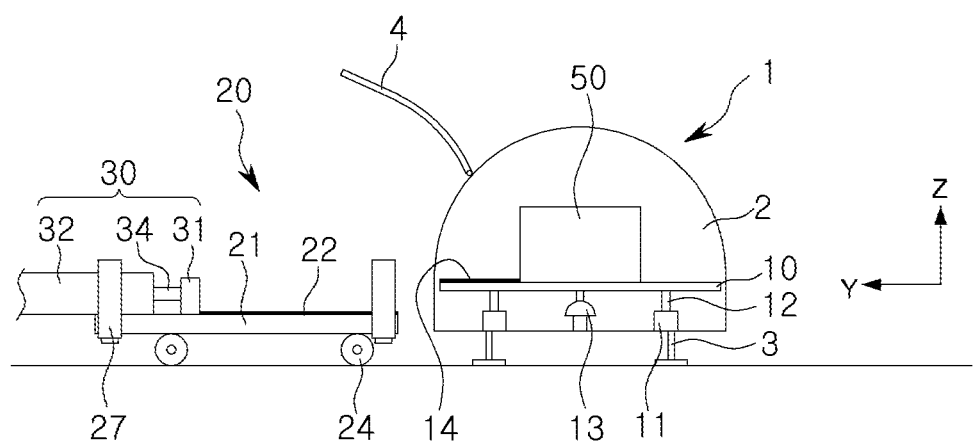
FIG. 1 is a front view illustrating a mobility and an apparatus for loading and unloading a cargo according to a first exemplary embodiment of the present disclosure.

As used herein, a mobility refers to various means of transportation that move a transported object, such as a person, an animal, or a cargo, from a departure point to a destination. Such a mobility is not limited to vehicles traveling on roads or tracks, and may include an unmanned drone, an air mobility, a water or underwater mobility, other mobile robots, etc.

However, in the present specification, for convenience of description, the present disclosure is described by taking a case where a mobility is an aerial vehicle having a cargo hold as an example, but is not necessarily limited thereto.

In addition, terms such as first and second may be used to describe various components, but the terms such as the first and second do not limit the order, size, location, and importance of these components, and are named only for the purpose of distinguishing one component from another.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Figure 2:
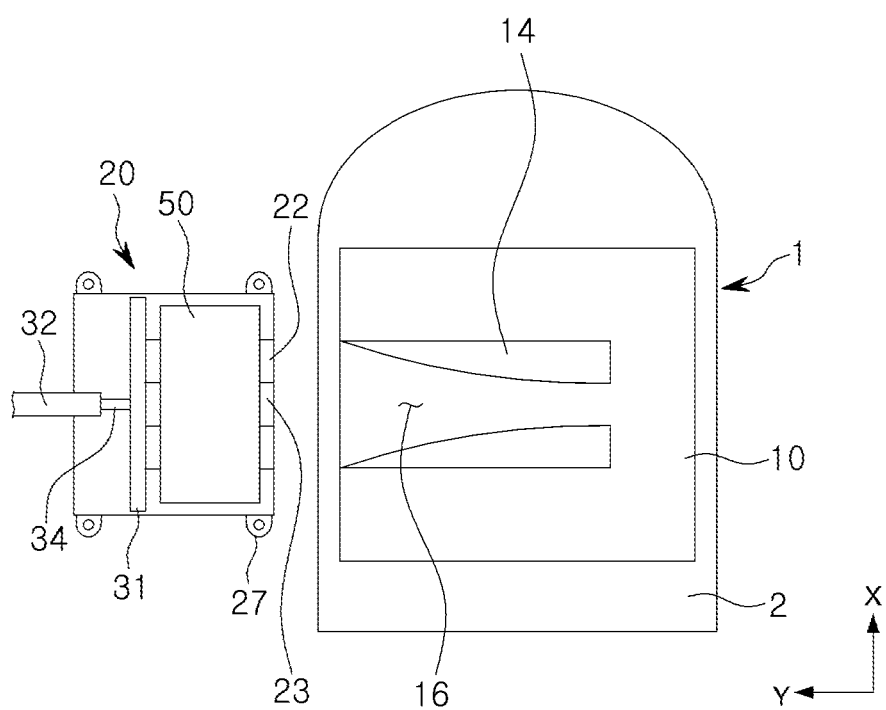
FIG. 2 is a plan view illustrating the mobility and the apparatus for loading and unloading a cargo according to the first exemplary embodiment of the present disclosure.

FIG. 1 is a front view illustrating a mobility and an apparatus for loading and unloading a cargo, according to a first exemplary embodiment of the present disclosure, and FIG. 2 is a plan view illustrating the mobility and the apparatus for loading and unloading a cargo according to the first exemplary embodiment of the present disclosure.

A mobility 1, according to the first exemplary embodiment of the present disclosure, may include a cargo hold 2 and a loading plate 10. For example, a cargo unmanned aerial system (CUAS) that may perform vertical take-off and landing and has a cargo hold 2 may be employed as the mobility 1. The CUAS may be used in the field of high-speed transportation of medium-sized cargo between cities. However, examples of the mobility are not limited to the CUAS, and various types of manned and/or unmanned mobility may be applied.

The mobility 1, according to the first exemplary embodiment of the present disclosure, may be provided with the cargo hold 2 in which a cargo is loaded. The cargo hold may be approached from either a left or right side of the mobility. The cargo hold may be configured to accommodate the loaded cargo.

The mobility 1 may have a plurality of wheels 3 provided at a bottom of a fuselage, configured to support or move the mobility 1 on a ground or in a cargo apron. For example, when the mobility is an air mobility, such as the CUAS, the plurality of wheels may be configured to act as landing gear.

Alternatively, when the mobility 1 is a land mobility, such as an autonomous vehicle, the plurality of wheels 3 may be mounted on the mobility 1, and each wheel may have an independent motor (not illustrated), configured to move the fuselage on the ground.

Figure 8:
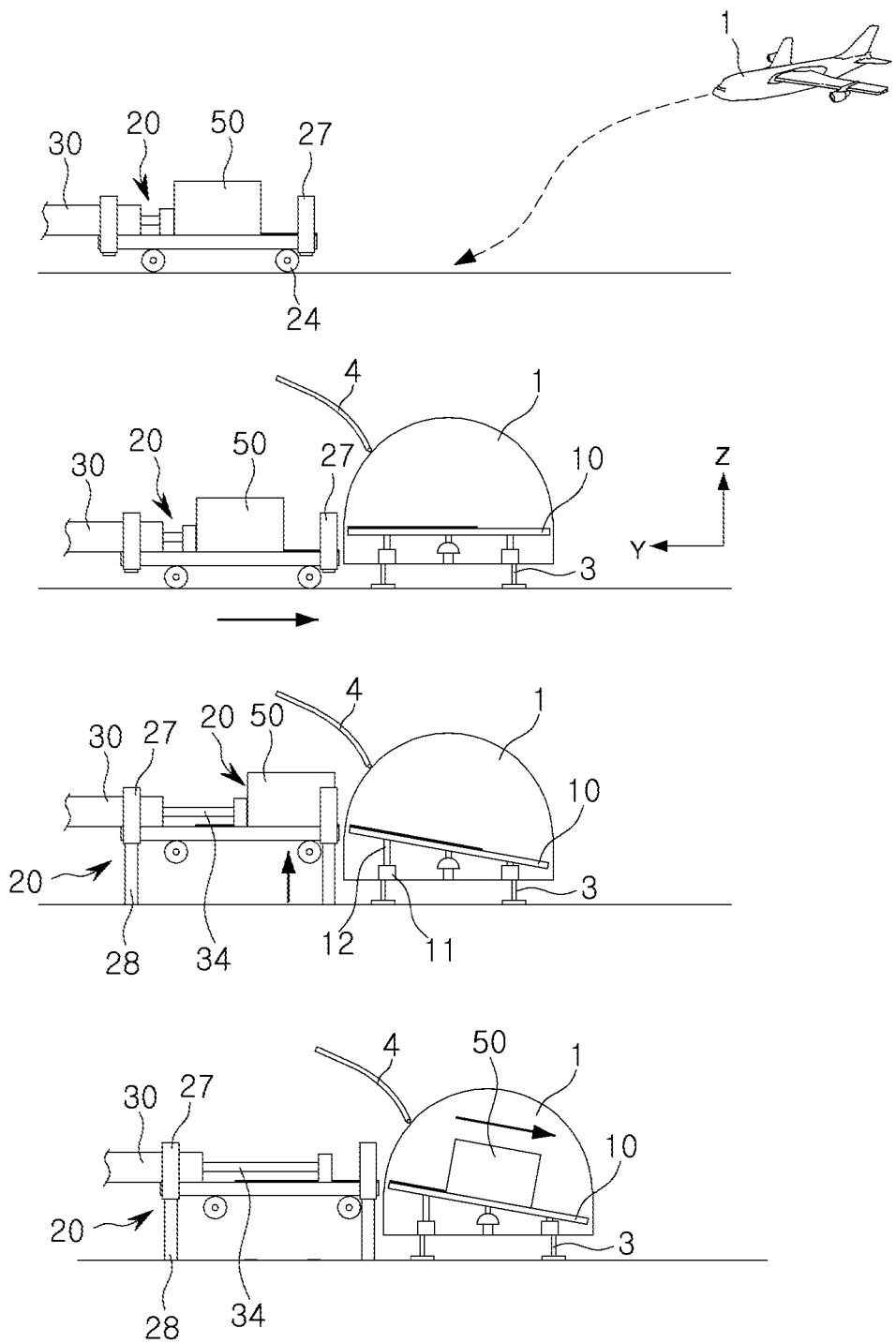
FIG. 8 is a diagram illustrating a process of loading a cargo to the mobility of the present disclosure by the apparatus for loading and unloading a cargo.
Figure 9:
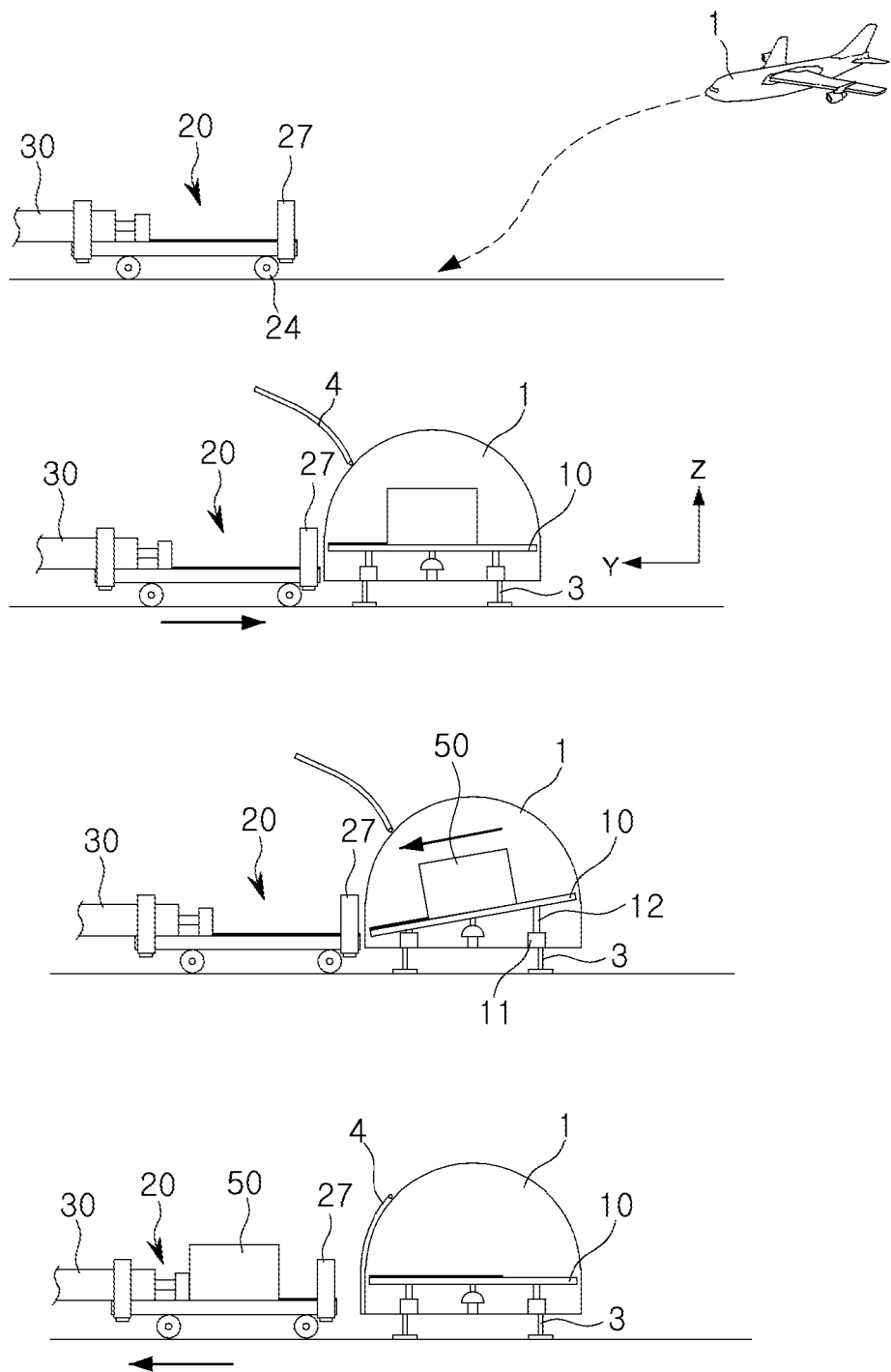
FIG. 9 is a diagram illustrating a process of unloading a cargo from the mobility of the present disclosure by the apparatus for loading and unloading a cargo.

In addition, when the mobility 1 is an air mobility, such as a manned or unmanned aerial vehicle, the mobility may include a plurality of wings or a plurality of rotors provided on the fuselage (see FIGS. 8 and 9). For example, the plurality of rotors may be provided for vertical take-off and landing and horizontal flight of the fuselage.

A door 4 may be formed on one side surface of the mobility 1 to correspond to the cargo hold 2. A sliding door that opens and closes along a longitudinal direction X of the mobility may be employed as the door. However, the shape of the door is not necessarily limited thereto, and a door that opens and closes vertically, a hinged door, and/or other suitable door or doors may be employed.

The loading plate 10 may be configured to be positioned to be spaced apart from the bottom of the cargo hold in the cargo hold 2 of the mobility 1, and may be configured to be installed to be tiltable toward either side of the mobility in the cargo hold. At least one tilting driver 11 for tilting the loading plate may be installed between the loading plate 10 and the bottom of the cargo hold 2. A hydraulic cylinder having an operation rod 12, an electric actuator, or the like may be employed as a tilting driver. For example, when a pivoting member 13, extending in a height direction Z of the cargo hold 2 under a center of the loading plate 10 in a width direction Y or a rotation shaft (not illustrated) extending in the longitudinal direction X of the cargo hold, is mounted, the tilting driver 11 may be eccentric in the width direction of the loading plate and arranged under at least one side of the loading plate. In this case, the loading plate may be tilted about the pivoting member or the rotation shaft. Of course, the tilting drivers 11 may each be arranged under both sides of the loading plate 10 in the width direction. When a pair of tilting drivers is each arranged under both sides of the loading plate in the width direction, the pivoting member or the rotation shaft may be omitted.

FIG. 1 illustrates an example in which the pair of tilting drivers 11 and the pivoting member 13 may be applied under the loading plate 10 in the mobility 1, according to the first exemplary embodiment of the present disclosure.

A plurality of guides 14 may be formed on an upper surface of the loading plate 10, configured to support a package unit 50, to be described later, and configured to guide the package unit 50 to move in the width direction Y of the loading plate. The guide protrudes upward from the upper surface of the loading plate and is formed to extend along the width direction Y of the loading plate. The plurality of guides may be arranged to be spaced apart from each other along the longitudinal direction X of the loading plate. In addition, at least one side surface of the guide 14 may be formed with an inclined surface 15 that is gently inclined with respect to the width direction Y of the loading plate 10. Accordingly, a groove portion 16 (refer to FIG. 3B) having a substantially trapezoidal shape tapered by the inclined surfaces may be formed between the pair of guides, adjacent to each other.

A width of the groove portion 16 due to its tapered shape, that is, a distance in the longitudinal direction X of the loading plate 10 between the inclined surfaces 15, may be greatest at one end of the guide 14 and may gradually decrease toward the other end of the guide. For example, the groove portion 16 may be formed to be widened toward the door 4 of the cargo hold 2 by the inclined surface 15 of the guide 14, and gradually narrowed to the opposite side.

The mobility 1 may further include a controller (not illustrated) configured to control operations of the tilting driver 11, the door 4, and/or a fastener 17, to be described later. Such a controller may be integrated into another controller installed in the mobility or a higher main control system, or may be configured as a combined function.

In addition, the mobility 1 may further include a reaction member 19 (see FIG. 4) for controlling the apparatus for loading and unloading a cargo. This reaction member may be attached to or mounted on the fuselage of the mobility and an end portion of the door 4 side of the loading plate 10. The configuration and operation of the reaction member will be described later.

Figure 3A:
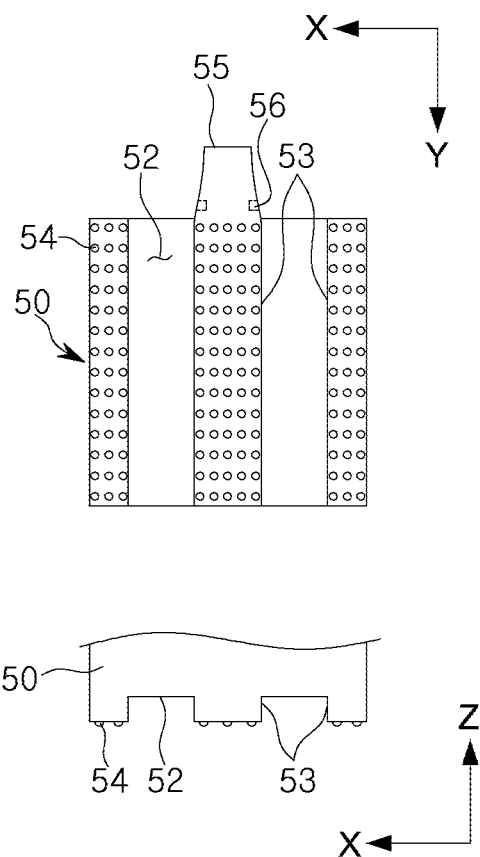
FIGS. 3A to 3C are diagrams for describing coupling of a package unit and a loading plate.
Figure 3B:
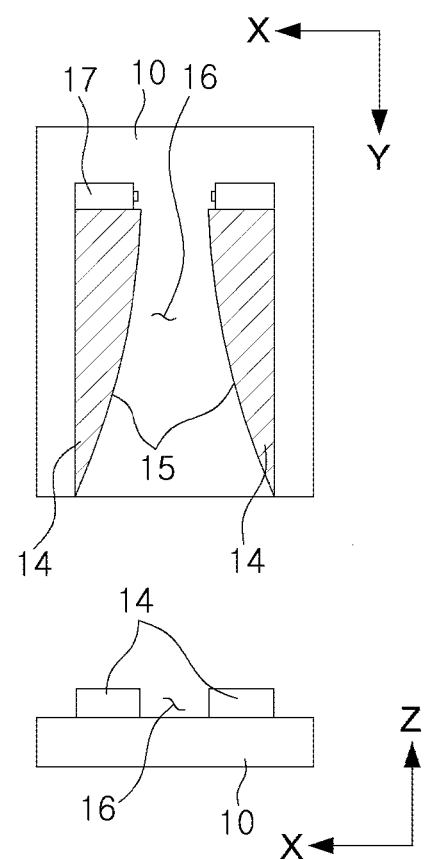
Figure 3C:
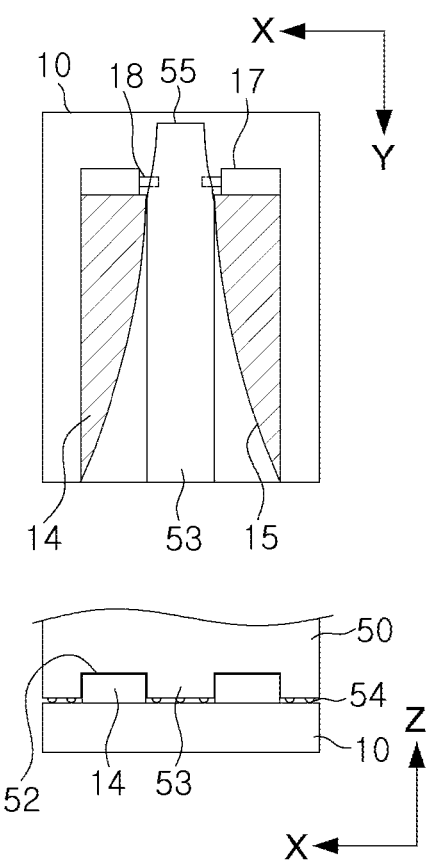

FIGS. 3A to 3C are diagrams for describing coupling of the package unit and the loading plate.

The package unit 50 may include a container configured to accommodate a cargo to transport the cargo, or a tray on which the cargo may be fixedly placed. The configuration of the package unit 50, specifically, the shape and size thereof, may preferably be standardized according to specifications of the mobility 1 or a transport robot 20, to be described later.

As illustrated in FIG. 3A, a plurality of guide grooves 52 may be formed on a bottom surface of the package unit 50. The plurality of guide grooves may be formed parallel to each other, and may be arranged to be spaced apart from each other. This guide groove 52 may be configured to sufficiently accommodate the guide 14 of the loading plate 10, and may be configured to guide the package unit to linearly slide along the guide.

In addition, a plurality of ball transfers 54 may be mounted on the bottom surface of the package unit 50. For example, the plurality of ball transfers may be arranged in a portion excluding the guide groove 52 on the bottom surface of the package unit. The portion excluding the guide groove on the bottom surface of the package unit is called a protrusion 53.

Due to the plurality of ball transfers 54, a frictional force may be reduced when the package unit 50 moves on the loading plate 10 of the cargo hold 2, so the package unit may be configured to slide smoothly.

The package unit 50 may further include an extension 55 formed by extending at least one of the protrusions 53 in the longitudinal direction of the protrusion from one side surface thereof. The extension and/or protrusion may be inserted between the pair of guides 14, adjacent to each other, of the loading plate, that is, into the groove portion 16 when the package unit is placed on the loading plate 10 of the cargo hold 2.

Furthermore, as illustrated in FIG. 3B, since the groove portion 16 between the guides 14 may have a tapered shape that may be gradually reduced after being widened, even if the insertion direction of the extension 55 of the package unit 50 and the subsequent protrusion 53 slightly deviates, the insertion and movement directions may be corrected while the package unit slides on the loading plate 10 by both guides 14.

For example, since a dimension of the protrusion 53 in the width direction may be larger than that of the extension 55, when the protrusion 53 reaches the other end of the guide 14 after the extension 55 completely penetrates through the groove portion 16, the protrusion may be fitted between the guides with a minimum spacing among the groove portions 16, so the movement of the protrusion may be completed, and the protrusion may be seated in the groove portion.

Optionally, an inclined portion or a stepped portion may be formed between the extension 55 and the protrusion 53.

Accordingly, when the package unit 50 is mounted on the loading plate 10, the movement of the package unit may be prevented, and the standardized package unit may be mounted on the loading plate of the cargo hold 2 at a constant position. According to an exemplary embodiment, the standardized package unit may always be mounted on the loading plate of the cargo hold 2 at a constant position.

Optionally, as illustrated in FIG. 3C, the extension 55 of the package unit 50 may be provided with a fastening hole 56, and the other end of at least one of the pair of guides 14, positioned adjacent to the extension, may be provided with a fastener 17 that has an operation rod 18 configured to be insertable into the fastening hole to control the movement of the package unit.

A hydraulic cylinder, such as a pneumatic cylinder, that has the operation rod 18, an electric actuator, such as a solenoid actuator, that has the operation rod, and the like may be employed as the fastener 17.

The fastener 17 may be arranged so that an expansion/contraction direction of the operation rod 18 may be arranged to be perpendicular to the movement direction of the package unit 50. Accordingly, when the operation rod of the fastener is expanded, the operation rod may be configured to be inserted into the fastening hole 56 of the extension to prevent the movement of the package unit, and when the operation rod is contracted, the movement of the package unit may be allowed.

The fastener 17 may be electrically connected to the controller of the mobility 1. For example, as the extension 55 of the package unit 50 is sensed by a separate sensor such as a position sensor or a limit switch, the controller may be configured to control the operation rod 18 of the fastener to be expanded.

However, the configuration and arrangement for fixing the position of the package unit 50 with respect to the loading plate 10 may not necessarily be limited to the above example. For example, the fastening hole 56 may be formed on at least one side surface of the protrusion 53 without the extension, and the fastener 17 having the operation rod 18 may be installed to be embedded in at least one of the pair of guides 14.

Accordingly, in the mobility 1, according to the first exemplary embodiment of the present disclosure, the standardized package unit 50 may be fixedly maintained on the loading plate 10 of the cargo hold 2 at a constant position. According to an exemplary embodiment, the standardized package unit 50 may always be fixedly maintained on the loading plate 10 of the cargo hold 2 at a constant position.

In addition, when the mobility 1, according to the first exemplary embodiment of the present disclosure, transports cargoes, in rotational motions such as rolling, pitching, and yawing of the mobility that may occur during all operations of the mobility, for example, horizontal movement, take-off and landing, turning, and hovering, the posture and position of the package unit may be maintained by the guide 14 of the loading plate 10, the fastener 17, and the protrusion 53, extension 55, and fastening hole 56 of the package unit 50.

Referring back to FIGS. 1 and 2, the apparatus for loading and unloading a cargo, according to the present disclosure, may include the loading plate 10 of the mobility 1 described above and the transport robot 20 that is configured to transport the package unit 50.

The transport robot 20 may be capable of, and configured to perform, autonomous driving. A top plate 21 of the transport robot may have an overall flat shape, and the top plate may act as a loading region of the package unit 50.

The top plate 21 of the transport robot 20 may be provided with a plurality of guide rails 22 that may be configured to support the package unit 50 and guide the package unit 50 to move in the longitudinal direction X of the transport robot. The guide rail may protrude upward from the top plate and may be formed to extend along the longitudinal direction of the transport robot. The plurality of guide rails may be arranged to be spaced apart from each other along the width direction Y of the transport robot.

A substantially rectangular groove portion 23 may be formed between the pair of guide rails 22 adjacent to each other.

Figure 6:
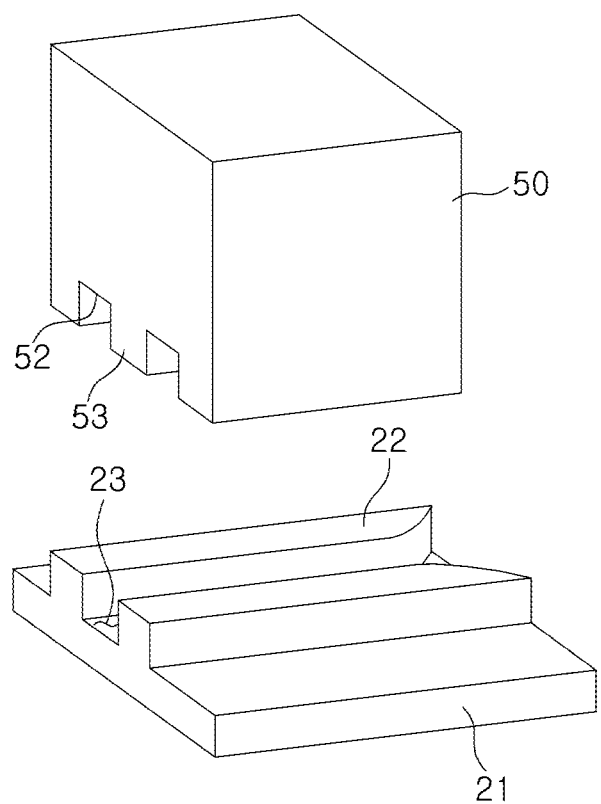
FIG. 6 is a perspective view illustrating a package unit and a top plate of a transport robot applied to the apparatus for loading and unloading a cargo.

Optionally, in one end portion of the guide rail 22, at least one side surface of the guide rail may be formed with an inclined surface gently inclined with respect to the longitudinal direction X of the transport robot (see FIG. 6). Accordingly, a substantially trapezoidal region tapered by the inclined surfaces may be formed at least partially in the groove portion 23.

For example, the trapezoidal region of the groove portion 23 may be formed to be widened toward the cargo hold 2 side by the inclined surface of the guide rail 22, and gradually narrowed to the opposite side.

The transport robot 20 may have wheels 24 provided in at least four places on the lower portion, respectively. A driving device (not illustrated) may be connected to at least one wheel. For example, the driving device may include a driving shaft, a speed reducer, and a first motor. Also, a steering device (not illustrated) may be connected to at least one wheel. For example, the steering device may include a steering shaft, a speed reducer, and a second motor.

The first motor and the second motor may be electrically connected to a control unit (not illustrated) of the transport robot 20, and, when the first motor and the second motor rotate forward and reverse, the driving shaft and the steering shaft may be configured to rotate forward and reverse, and the corresponding wheel 24 connected to the driving shaft and the steering shaft may be configured to rotate, so that the transport robot may move in the desired direction.

In the transport robot 20, the traveling direction, traveling speed, turning direction, turning speed, stop position, raising and lowering, emergency stop, etc., may be controlled by the control unit. For the control of such autonomous driving, the transport robot may be provided with a battery and various sensors (not illustrated).

Since various technologies have been proposed and known for a control unit to control a transport robot or a vehicle using various sensors for autonomous driving, a detailed description thereof will be omitted herein. However, the control of the transport robot 20 for loading that transfers the package unit 50 to the mobility 1 and for unloading that receives the package unit from the mobility will be described below.

Figure 4:
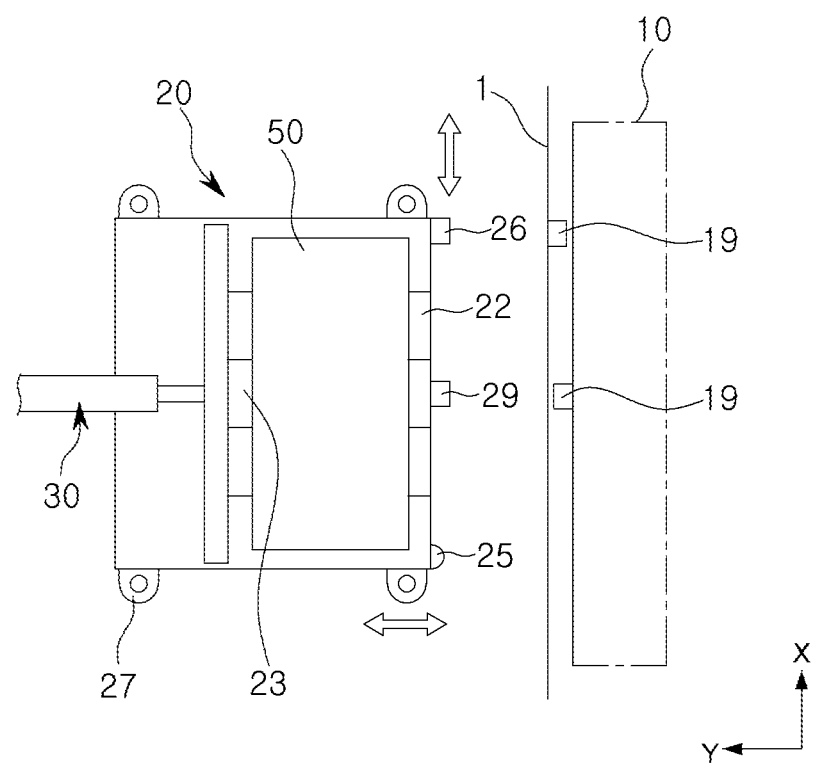
FIG. 4 is a diagram for describing distance alignment and positioning during an operating state of the apparatus for loading and unloading a cargo.

FIG. 4 is a diagram for describing distance alignment and positioning during an operating state of the apparatus for loading and unloading a cargo.

The transport robot 20 of the apparatus for loading and unloading a cargo may further include a distance alignment unit 25 configured to detect the distance between the transport robot and the mobility so that the transport robot 20 may be configured to minimize the distance from the cargo hold 2 of the mobility 1 (a minimum distance) to deliver or receive a cargo.

The distance alignment unit 25 may include a proximity sensor, such as an ultrasonic sensor and an electromagnetic sensor, configured for minimizing a gap between an edge of the top plate 21 of the transport robot 20 and the mobility in the width direction Y of the mobility 1.

Until the proximity sensor of the distance alignment unit 25 detects the mobility 1, the transport robot 20 may be configured to move in the width direction Y of the mobility.

In addition, the transport robot 20 of the apparatus for loading and unloading a cargo may further include a positioning unit 26 configured to recognize the position of the transport robot with respect to the cargo hold so that the transport robot 20 may align the top plate 21 of the transport robot and the cargo hold 2 of the mobility 1 to deliver or receive a cargo.

The positioning unit 26 may include a position sensor, such as an image sensor, an optical sensor, and a magnetic sensor, configured to align the positions of the transport robot 20 and the cargo hold 2 in the longitudinal direction X of the mobility.

The above-described reaction member 19 for detecting by the position sensor may be attached to or mounted on the side surface of mobility 1. Such a reaction member may be a variety of members depending on the shape and specifications of the position sensor.

For example, when the positioning unit 26 is an image sensor, a marker having a predetermined shape and color may be used as the reaction member 19. When the positioning unit is an optical sensor, a reflector that reflects light or a corresponding sensor configured to emit or receive light may be used as a reaction member. In addition, when the positioning unit is a magnetic sensor, a permanent magnet or a ferromagnetic material may be used as a reaction member.

Here, since the transport robot 20 needs to detect the position in the state where the door 4 of mobility 1 is open, the reaction member 19 may be preferably attached to the fuselage of mobility. However, depending on the shape of the door, the reaction member may be attached to the door.

After the transport robot 20 moves near the cargo hold 2 of the mobility 1, the transport robot may be configured to move in the longitudinal direction X of the mobility until the position sensor of the positioning unit 26 detects the corresponding reaction member 19 of the mobility.

The distance alignment unit 25 and the positioning unit 26 may be configured to transmit a detection signal to the control unit. Accordingly, the control unit may be configured to prevent the transport robot 20 from moving in the corresponding direction, thereby minimizing the distance between the top plate 21 of the transport robot and the cargo hold 2 and aligning the position.

Figure 5:
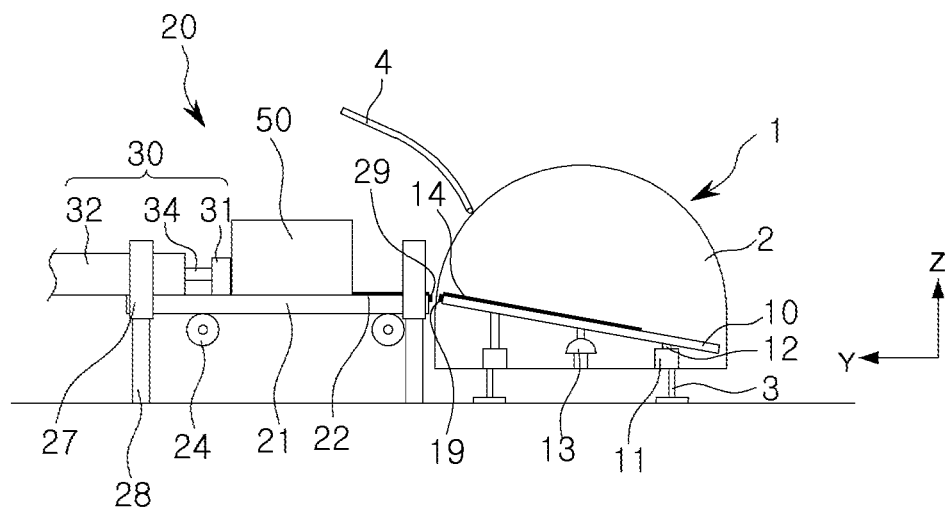
FIG. 5 is a diagram for describing height alignment during the operating state of the apparatus for loading and unloading a cargo.

FIG. 5 is a diagram for describing height alignment during the operating state of the apparatus for loading and unloading a cargo.

The transport robot 20 of the apparatus for loading and unloading a cargo may further include a plurality of elevators 27 configured to raise the transport robot 20 from the ground and lower the transport robot back to the ground for the height alignment with one end of the loading plate 10 in the cargo hold 2.

The plurality of elevators 27 may be arranged to operate without interfering with the wheels 24 on the side surface or bottom surface of the transport robot 20. For example, a hydraulic cylinder, an electric actuator, or the like, having an expandable operation rod 28 may be employed as such an elevator.

In order to control the operation of the elevator 27, the sensor unit 29 may be installed at the edge of the top plate 21 of the transport robot 20, and the above-described reaction member 19 may be attached to or mounted on the end portion of the loading plate 10.

The sensor unit 29 may include a sensor, such as a magnetic door sensor and an optical sensor, configured to align the height of the top plate 21 of the transport robot 20 and one end of the loading plate 10 in the height direction Z of the mobility 1.

The reaction member 19 may be formed of various members according to the shape and specifications of the sensor unit 29.

For example, when the sensor unit 29 is a magnetic door sensor, a permanent magnet or a ferromagnetic material may be used as the reaction member 19. When the sensor unit is an optical sensor, the reflector that reflects light or the corresponding sensor that emits or receives light may be used as the reaction member.

Accordingly, after the transport robot 20 arrives near the cargo hold 2, when the operation rod 28 of the elevator 27 operates to raise and lower the transport robot, the sensor unit 29 of the transport robot may be configured to detect a magnetic field or light from the corresponding reaction member 19 of the loading plate 10, and may be configured to transmit the detection signal to the control unit of the transport robot. Therefore, by stopping the operation of the elevator by the control unit, the height alignment between the top plate 21 of the transport robot and one end of the loading plate may be achieved.

FIG. 6 is a perspective view illustrating the package unit and the top plate of the transport robot applied to the apparatus for loading and unloading a cargo, and illustrates the package unit 50 formed in a substantially hexahedral box shape, but the shape of the package unit is necessarily limited thereto.

As described above, the configuration of the package unit 50, specifically, the shape and size thereof, may be preferably standardized according to specifications of the mobility 1 or the transport robot 20.

A plurality of guide grooves 52, through which the plurality of guide rails 22 formed on the top plate 21 of the transport robot 20 respectively penetrate and are coupled, may be formed on the bottom surface of the package unit 50. The plurality of guide grooves may be formed parallel to each other. Like the plurality of guide rails, the plurality of guide grooves may be arranged to be spaced apart from each other.

The guide groove 52 may be shape-fitted with the guide rail 22 to guide the package unit 50 to linearly slide along the guide rail.

When the package unit 50 is placed on the top plate 21 of the transport robot 20 from the loading plate 10 of the cargo hold 2, the protrusion 53 may be inserted between the pair of guide rails 22 adjacent to each other of the top plate, that is, into the groove portion 23.

Moreover, since at least a portion of the groove portion 23 between the guide rails 22 may have a tapered shape that is gradually reduced after being widened, even if the insertion direction of the protrusion 53 of the package unit 50 slightly deviates, the insertion and movement direction may be corrected while the package unit slides on the top plate 21 of the transport robot 20 by both guide rails.

In addition, the package unit 50 may have a plurality of ball transfers 54 (refer to FIG. 3A) mounted on the bottom thereof. Due to the plurality of ball transfers, a frictional force may be reduced when the package unit 50 moves on the top plate 21 of the transport robot 20, so the package unit may slide smoothly.

In this case, the movement of the package unit on the top plate 21 may be stopped by a pusher to be described later.

Figure 7A:
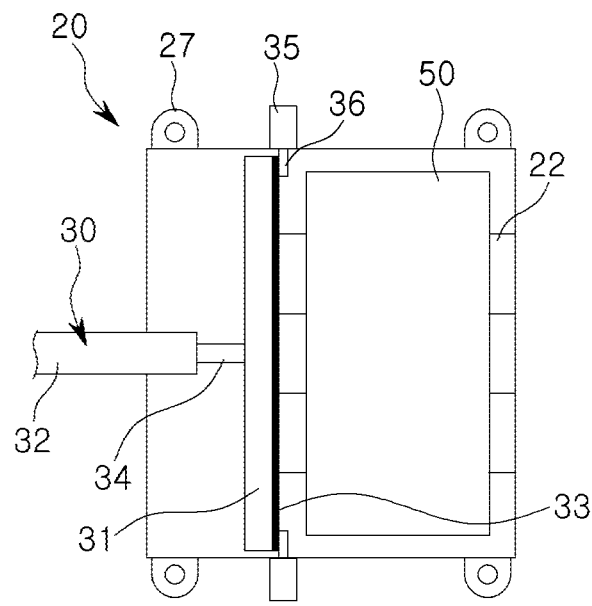
FIGS. 7A and 7B are diagrams for describing an operation of a pusher in the operating state of the apparatus for loading and unloading a cargo.
Figure 7B:
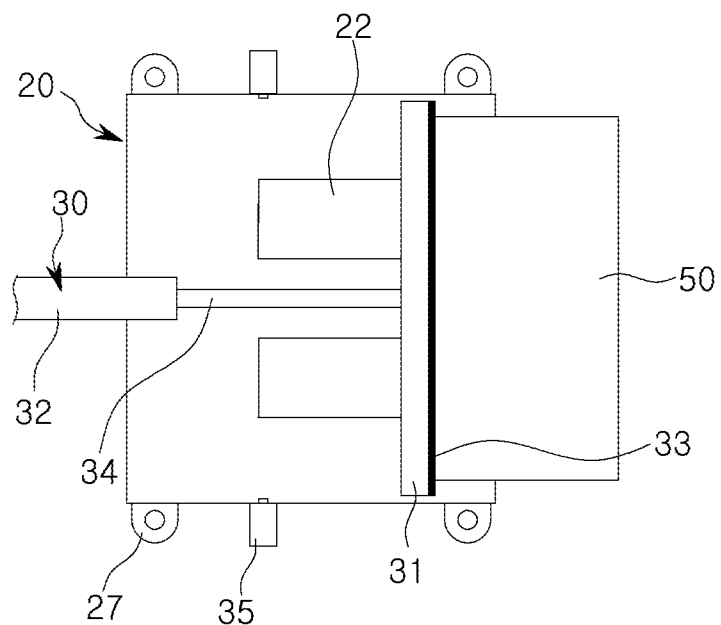

FIGS. 7A and 7B are diagrams for describing an operation of a pusher in the operating state of the apparatus for loading and unloading a cargo.

The transport robot 20 of the apparatus for loading and unloading a cargo may further include a pusher 30 that is installed on the top plate 21, and may be configured to push the package unit 50 placed on the top plate to move the package unit 50 to the loading plate 10 in the cargo hold 2.

The pusher 30 may include a pusher head 31 having one side in direct contact with the package unit 50 and a pusher driver 32 connected to the other side of the pusher head configured to provide a driving force.

Since one side of the pusher head 31 may be formed as a flat surface, the flat surface may directly and stably contact the package unit 50. The flat surface may be provided with a cushioning material 33 made of an elastic material such as rubber or a resin.

By providing the cushioning material 33 in this way, the pusher head 31 may be configured to move the package unit by contacting the package unit 50 without damaging the package unit 50 or the cargo and, as will be described later, may be configured to stop the movement of the package unit or the cargo sliding down from the loading plate 10 of the cargo hold 2 without damaging the package unit or the cargo.

In addition, a plurality of concave grooves (not illustrated) through which the plurality of guide rails 22 formed on the top plate 21 of the transport robot 20 are respectively penetrated and coupled may be formed on the bottom surface of the pusher head 31. The concave groove may be shape-fitted with the guide rail so that the pusher head linearly reciprocates smoothly along the guide rail. Like the plurality of guide rails, the plurality of concave grooves may be arranged to be spaced apart from each other along the width direction Y of the transport robot.

For example, the hydraulic cylinder, the electric actuator, or the like, having an operation rod 34 may be employed as the pusher driver 32. The pusher driver may be installed on the top plate 21 together with the pusher head 31, and may be raised and lowered on the top plate in the same manner as the top plate.

Optionally, a stopper 35 that controls the operation of the pusher 30 may be installed on the top plate 21. The hydraulic cylinder, such as the pneumatic cylinder, that has an operation rod 36, the electric actuator, such as the solenoid actuator, that has an operation rod, and the like may be employed as the stopper.

The stopper 35 may be arranged so that the expansion and contraction direction of the operation rod 36 may be perpendicular to the moving direction of the pusher head 31. Accordingly, when the operation rod of the stopper is expanded, the pusher head may interfere, by the operation rod of the stopper, to prevent the movement of the pusher head, and when the operation rod is contracted, the pusher head may move without interference by the driving force of the pusher driver to contact the package unit 50.

The pusher driver 32 and the stopper 35 may be electrically connected to the control unit of the transport robot 20. For example, when the operation of the elevator 27 is completed or the detection signal of the sensor unit 29 is input, the control unit may sequentially control the operation rod of the stopper to contract and the operation rod of the pusher driver to be expanded.

In addition, the control unit may be configured to control the operation rod of the pusher driver 32 to be contracted immediately after the maximum expansion, and may be configured to control the operation rod of the stopper 35 to be expanded after the operation of the pusher driver is completed.

FIG. 8 is a diagram illustrating a process of loading a cargo to the mobility of the present disclosure by the apparatus for loading and unloading a cargo. Referring to FIG. 8, a process of loading the package unit 50, in which the cargo is placed, into the cargo hold 2 of the mobility 1 from the transport robot 20 will be briefly described.

The mobility 1 may be located on the ground or at the cargo apron, and the transport robot 20 may be configured to move toward the mobility while carrying the cargo accommodated in the package unit 50 standardized on the top plate 21.

After the transport robot 20 moves near the cargo hold, the transport robot may be configured to move in the width direction Y of the mobility until the distance alignment unit 25 detects the mobility 1 for more precise distance adjustment. Also, the transport robot may be configured to move in the longitudinal direction X of the mobility until the positioning unit 26 detects the corresponding reaction member 19 of the mobility.

When the distance alignment unit 25 and the positioning unit 26 detect a sensing target and transmit the detection signal to the control unit of the transport robot 20, the control unit may be configured to control the first and second motors to prevent the transport robot 20 from moving. In this way, the distance alignment and positioning between the top plate 21 of the transport robot and the cargo hold 2 may be achieved.

Meanwhile, in the cargo hold 2 of the mobility 1, the tilting driver 11 may be configured to operate to tilt the loading plate 10. The controller of the mobility may be configured to open the door 4 in advance and may be configured to tilt the loading plate according to the set control logic, or may be configured to open the door and tilt the loading plate as the approach of the transport robot 20 is detected by a separate sensor.

The controller of the mobility 1 may be configured to tilt the loading plate by operating the tilting driver 11 so that, among both ends of the loading plate 10, one end that the transport robot 20 approaches is positioned higher.

Next, after the transport robot 20 arrives near the cargo hold 2 and is distance-aligned and positioned, the control unit of the transport robot may be configured to operate the elevator 27 to raise the transport robot.

In this case, when the sensor unit 29 of the transport robot 20 detects a magnetic field or light from the corresponding reaction member 19 of the loading plate 10, and transmits the detection signal to the control unit of the transport robot, the control unit may be configured to stop the operation of the elevator 27 to perform the height alignment between the top plate 21 of the transport robot and the loading plate.

Then, the pusher 30 of the transport robot 20 may be configured to operate to push the package unit 50 placed on the top plate 21 of the transport robot, thereby moving the package unit, in which the cargo is placed, to the loading plate 10 in the cargo hold 2.

To this end, the operation rod 36 of the stopper 35 that prevents the movement of the pusher head 31 may be contracted, and the pusher head may be configured to move without interference by the driving force of the pusher driver 32 to contact the package unit 50.

In addition, due to the plurality of ball transfers 54, the package unit 50 may be configured to slide smoothly due to the reduced frictional force when moving on the top plate 21 of the transport robot 20.

The package unit 50 moving to the loading plate 10 may be configured to slide down along the tilted loading plate by the weight of the cargo and its own weight and, due to the positioning between the top plate 21 of the transport robot 20 and the loading plate, the extension 55 and protrusion 53 of the package unit may be easily inserted into the groove portion 16 between the inclined surfaces 15 of the loading plate and, at the same time, the guide 14 of the loading plate may be accommodated in the guide groove 52 of the package unit, so the package unit may linearly move on the loading plate.

In addition, due to the plurality of ball transfers 54, the package unit 50 may be configured to slide smoothly due to the reduced frictional force when moving on the top plate 21.

The package unit 50 may be configured to reach the other end of the guide 14 due to the kinetic energy coming down from the tilted loading plate 10, and the protrusion may be fitted between the guides having the smallest gap among the groove portions 16, so the movement of the package unit may be stopped.

Optionally, when the extension 55 of the package unit 50 passes the other end of the guide 14, the fastener 17 of the loading plate 10 may be configured to operate to insert the operation rod 18 into the fastening hole 56 of the extension, so the position of the package unit may be fixed on the loading plate.

Finally, the tilting driver 11 may be configured to operate in the cargo hold 2 to keep the loading plate 10 horizontal. In this way, the cargo may be automatically loaded from the transport robot 20 into the cargo hold of the mobility 1 without the aid of manpower.

FIG. 9 is a diagram illustrating a process of unloading a cargo from the mobility by the apparatus for loading and unloading a cargo. Referring to FIG. 9, a process of unloading the package unit 50, in which the cargo is placed, from the cargo hold 2 of the mobility 1 to the transport robot 20 will be briefly described.

The mobility 1 loaded with the cargo accommodated in the package unit 50 may be located on the ground or the cargo apron, and the transport robot 20 in which the top plate 21 is empty may be configured to move toward the mobility.

After the transport robot 20 moves near the cargo hold, the transport robot may be configured to move in the width direction Y of the mobility until the distance alignment unit 25 detects the mobility 1 for more precise distance adjustment. Also, the transport robot may be configured to move in the longitudinal direction X of the mobility until the positioning unit 26 detects the corresponding reaction member 19 of the mobility.

When the distance alignment unit 25 and the positioning unit 26 detect a sensing target and transmit the detection signal to the control unit of the transport robot 20, the control unit may be configured to control the first and second motors to prevent the transport robot 20 from moving. In this way, the distance alignment and positioning between the top plate 21 of the transport robot and the cargo hold 2 may be achieved.

Meanwhile, in the cargo hold 2 of the mobility 1, the tilting driver 11 may be configured to operate to tilt the loading plate 10. The controller of the mobility may be configured to open the door 4 in advance and may be configured to tilt the loading plate according to the set control logic, or may be configured to open the door and tilt the loading plate as the approach of the transport robot 20 is detected by a separate sensor.

The controller of the mobility 1 may be configured to tilt the loading plate by operating the tilting driver 11 so that, among both ends of the loading plate 10, one end that the transport robot 20 approaches is positioned lower.

Next, after the transport robot 20 arrives adjacent to the cargo hold 2 and is distance-aligned and positioned, the control unit of the transport robot may be configured to operate the elevator 27 as needed to achieve the height alignment between the top plate 21 of the transport robot and the loading plate 10. When the height between the top plate of the transport robot and one end of the low-tilted loading plate matches, the operation of the elevator may be omitted.

Then, when the tilting of the loading plate 10 is completed, the fastener 17 of the loading plate 10, inserted into the fastening hole 56 of the extension 55 of the package unit 50, may be configured to operate under the control of the controller, so the coupling of the fastener and the fastening hole is released. Accordingly, the package unit may be configured to slide down the tilted loading plate by the weight of the cargo and its own weight.

Due to the positioning between the top plate 21 of the transport robot 20 and the loading plate 10, the protrusion 53 of the package unit 50 may be configured to move into the groove portion 23 between the guide rails 22 of the top plate without interference and, at the same time, the guide rail 22 may be accommodated in the guide groove 52 of the package unit 50, so the package unit may linearly move on the top plate.

In addition, due to the plurality of ball transfers 54, the package unit 50 may be configured to slide smoothly due to the reduced frictional force when moving on the loading plate 10 and on the top plate 21 of the transport robot 20.

The package unit 50 may be configured to reach the pusher 30 of the transport robot 20 due to the kinetic energy coming down from the tilted loading plate 10 and, since the pusher head 31 may be provided with the cushioning material 33 made of an elastic material, the pusher may be configured to stop the movement of the package unit without damage.

Finally, the tilting driver 11 may be configured to operate in the cargo hold 2 to keep the loading plate 10 horizontal, and the transport robot 20 may be configured to transport the cargo in the package unit 50 to a predetermined destination. In this way, the cargo may be automatically unloaded from the cargo hold of the mobility 1 onto the transport robot without the aid of manpower.

Figure 10:
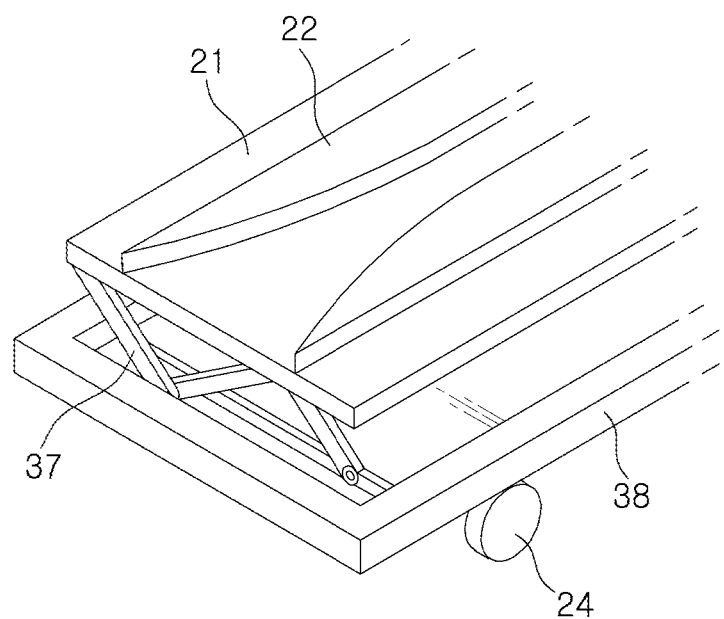
FIG. 10 is a diagram illustrating a modified example of the transport robot applied to the apparatus for loading and unloading a cargo.

FIG. 10 is a diagram illustrating a modified example of the transport robot applied to the apparatus for loading and unloading a cargo.

In the modified example illustrated in FIG. 10, the transport robot 20 may include a lifter 37 configured to raise and lower only the top plate 21 instead of the elevator 27.

Since the remaining components of the transport robot 20 are the same as the components of the transport robot illustrated in FIGS. 1 to 9, the same reference numerals are given to the same components as the above-described transport robot, and detailed descriptions of the configuration and functions will be omitted.

The transport robot 20 may be capable of autonomous driving. The transport robot may include a base portion 38, a top plate 21 that may be raised and lowered on the base portion, and a lifter 37 that is interposed between the base portion and the top plate and configured to raise and lower the top plate.

The base portion 38 of the transport robot 20 may include at least one pair of lifters 37. As the lifter, for example, a pantograph may be employed, but the configuration of the lifter may not necessarily be limited thereto.

The top plate 21 may have an overall flat shape, and the top plate may act as the loading region of the package unit 50.

Since the lifter 37 is interposed between the base portion 38 and the top plate 21, the top plate may be raised at least higher than the base portion.

The top plate 21 of the transport robot 20 may be provided with a plurality of guide rails 22 that may be configured to support the package unit 50 and guide the package unit 50 to move in the longitudinal direction X of the transport robot. The guide rail may protrude upward from the top plate and may be formed to extend along the longitudinal direction of the transport robot. The plurality of guide rails may be arranged to be spaced apart from each other along the width direction Y of the transport robot.

The lower portion of the base portion 38 may be provided with at least four wheels 24. The driving device may be connected to at least one wheel. For example, the driving device may include a driving shaft, a speed reducer, and a first motor. In addition, the steering device may be connected to at least one wheel. For example, the steering device may include a steering shaft, a speed reducer, and a second motor.

In addition, when the pantograph type lifter 37 is used, a third motor (not illustrated) for driving the pantograph may be installed on the base portion 38.

The first motor, the second motor, and/or the third motor may be electrically connected to a control unit (not illustrated) of the transport robot 20 and, when the first motor and the second motor rotate forward and reverse, the driving shaft and the steering shaft may be configured to rotate forward and reverse, and the corresponding wheel 24 connected to the driving shaft and the steering shaft may be configured to rotate, so the transport robot may be configured to move in the desired direction.

When the third motor rotates forward and reverse, the pantograph type lifter 37 may be expanded or contracted, so the top plate 21 of the transport robot 20 may be raised to a desired height and lowered to the base portion 38.

In the transport robot 20, the traveling direction, traveling speed, turning direction, turning speed, stop position, raising and lowering, emergency stop, etc., may be controlled by the control unit. For the control of such autonomous driving, the transport robot may be provided with a battery and various sensors (not illustrated).

The distance alignment unit 25 for detecting the distance between the transport robot 20 and the mobility 1 may be mounted on the base portion 38 of the transport robot. In addition, the positioning unit 26 for recognizing the position of the transport robot with respect to the cargo hold may be mounted on the base portion 38 of the transport robot.

In addition, in order to control the operation and rising height of the lifter 37, the sensor unit 29 may be installed at the edge of the top plate 21 of the transport robot 20.

For example, after the transport robot 20 arrives near the cargo hold 2, when the lifter 37 operates to raise the top plate 21 of the transport robot, the sensor unit 29 of the transport robot may be configured to detect the magnetic field or light from the corresponding reaction member 19 of the loading plate 10, and may be configured to transmit the detection signal to the control unit of the transport robot. Accordingly, by stopping the operation of the lifter by the control unit, the height alignment between the top plate of the transport robot and one end of the loading plate may be achieved.

The pusher 30 may be installed on the top plate 21 and may be configured to move the package unit to the loading plate 10 in the cargo hold 2 by pushing the package unit 50 placed on the top plate. In addition, the stopper 35 that controls the operation of the pusher 30 may be installed on the top plate 21.

Due to the transport robot 20 configured in this way, the apparatus for loading and unloading a cargo of the present disclosure may be configured to automatically load the package unit 50 into the cargo hold 2 of the mobility 1 from the transport robot without the aid of manpower, or unload the package unit 50 from the cargo hold of the mobility on the transport robot.

For example, after the transport robot 20 arrives near the cargo hold 2 and is distance-aligned and positioned, the control unit of the transport robot may be configured to operate the lifter 37 as needed to achieve the height alignment between the top plate 21 of the transport robot and the tilted loading plate 10 of the cargo hold.

When loading the cargo, the pusher 30 may be configured to push the package unit 50 placed on the top plate 21 to move the package unit to the loading plate 10 in the cargo hold 2.

The package unit 50 may be configured to slide down the tilted loading plate 10 by the weight of the cargo and its own weight.

Due to the plurality of ball transfers 54, the package unit 50 may be configured to slide smoothly due to the reduced frictional force when moving on the loading plate 10 or on the top plate 21 of the transport robot 20.

Due to the kinetic energy coming down from the tilted loading plate 10, when loading the cargo, the package unit 50 may be configured to reach the other end of the guide 14 and stop moving and, when unloading, reach the pusher 30 of the transport robot 20 and stop moving.

Finally, the tilting driver 11 may be configured to operate in the cargo hold 2 to keep the loading plate 10 horizontal and transport the cargo to the desired destination.

In this way, the transport robot 20 provided with the lifter 37 that raises and lowers only the top plate is configured so that the top plate 21 of the transport robot 20 may be raised and lowered at the same time as the distance alignment and positioning of the transport robot. Therefore, there is an advantage that loading or unloading of the cargo may be made more quickly and efficiently.

Figure 11:
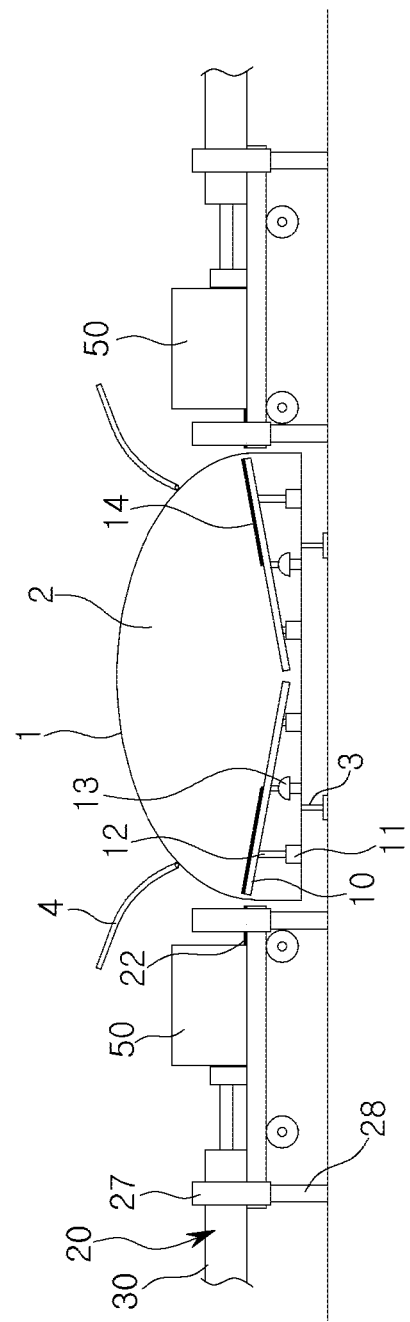
FIG. 11 is a front cross-sectional view illustrating a mobility and an apparatus for loading and unloading a cargo according to a second exemplary embodiment of the present disclosure.
Figure 12:
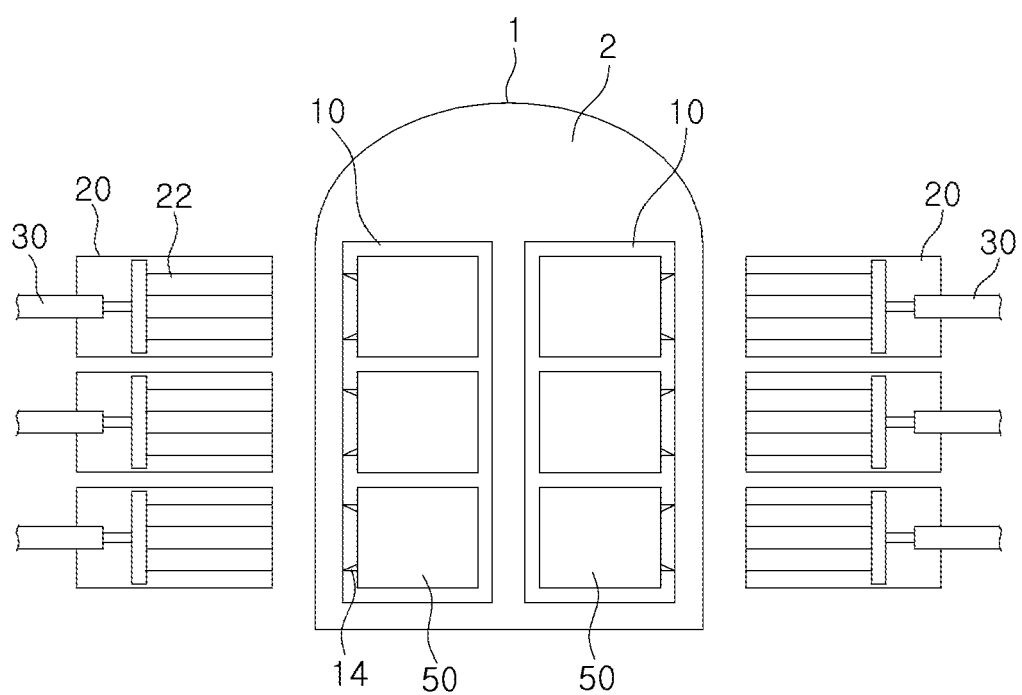
FIG. 12 is a plan cross-sectional view illustrating the mobility and the apparatus for loading and unloading a cargo according to the second exemplary embodiment of the present disclosure.

FIG. 11 is a front view illustrating a mobility and an apparatus for loading and unloading a cargo according to a second exemplary embodiment of the present disclosure, and FIG. 12 is a plan view illustrating the mobility and the apparatus for loading and unloading a cargo according to the second exemplary embodiment of the present disclosure.

A mobility 1 according to the second exemplary embodiment in the present disclosure may include a cargo hold 2 and a plurality of loading plates 10.

The second exemplary embodiment of the present disclosure illustrated in FIGS. 11 and 12 is different only in that the plurality of loading plates 10 are provided and the plurality of transport robots 20 are applied, and the remaining components are the same as the components of the mobility according to the first exemplary embodiment of the present disclosure. Therefore, in describing the mobility according to the second exemplary embodiment in the present disclosure, the same components as those of the mobility according to the first exemplary embodiment will be denoted by the same reference numerals, and a detailed description for configurations and functions of these components will be omitted.

The mobility 1 may be provided with the cargo hold 2 for loading cargo therein. The cargo hold may be approached from both sides of the mobility in the width direction, that is, from the left and right sides.

The plurality of loading plates 10 may be positioned to be spaced apart from the bottom of the cargo hold in the cargo hold 2 of the mobility 1, and may be installed to be tiltable toward either side of the mobility in the cargo hold.

For example, the pair of loading plates 10 may be arranged parallel to each other side by side in a lateral direction of mobility 1 in the cargo hold 2.

Alternatively, two or more pairs of loading plates 10 may be arranged in a grid form of two rows in the cargo hold.

At least one tilting driver 11 for tilting the corresponding loading plate may be installed between each loading plate 10 and the bottom of the cargo hold 2. For example, a hydraulic cylinder, an electric actuator, or the like, having an operation rod 12 may be employed as such a tilting driver.

For example, when a pivoting member 13 extending in a height direction Z of the cargo hold 2 under a center of each loading plate 10 in a width direction Y or a rotation shaft (not illustrated) extending in the longitudinal direction X of the cargo hold is mounted, the tilting driver 11 may be eccentric in the width direction of the corresponding loading plate and disposed under at least one side of the loading plate. In this case, the loading plate may be tilted about the pivoting member or the rotation shaft.

Of course, the tilting drivers 11 may each be arranged under both sides of each loading plate 10 in the width direction. When a pair of tilting drivers is each disposed under both sides of the loading plate in the width direction, the pivoting member or the rotation shaft may be omitted.

FIG. 11 illustrates an example in which the pair of tilting drivers 11 and the pivoting member 13 are applied under each loading plate 10 in the mobility according to the second exemplary embodiment of the present disclosure.

A door 4 may be formed on both side surfaces of the mobility 1 to correspond to the cargo hold 2. A sliding door that opens and closes along the longitudinal direction X of the mobility, a door that opens and closes vertically, and/or a hinged door or other suitable door may be used as such a door.

The mobility 1 may further include a controller (not illustrated) configured to control operations of the tilting driver 11, the door 4, and a fastener 17. Such a controller may be integrated into another controller installed in the mobility or a higher main control system, or may be configured as a combined function.

Optionally, the package unit 50 may be provided with a fastening hole 56, and one side of each loading plate may be provided with a fastener 17 that is provided with an operation rod 18 insertable into the fastening hole to control the movement of the package unit. As the fastener, a hydraulic cylinder, such as a pneumatic cylinder, that has the operation rod, an electric actuator, such as a solenoid actuator, that has the operation rod, and the like may be employed.

The fastener 17 may be disposed so that an expansion/contraction direction of the operation rod 18 may be disposed to be perpendicular to the movement direction of the package unit 50. Accordingly, when the operation rod of the fastener is expanded, the operation rod may be inserted into the fastening hole to prevent the movement of the package unit, and when the operation rod is contracted, the movement of the package unit may be allowed.

Accordingly, in the mobility according to the second exemplary embodiment in the present disclosure, the standardized package unit 50 may be fixedly maintained on each loading plate 10 of the cargo hold 2 at a constant position. According to an exemplary embodiment, the standardized package unit 50 may always be fixedly maintained on each loading plate 10 of the cargo hold 2 at a constant position.

The apparatus for loading and unloading a cargo according to the present disclosure may include the plurality of loading plates 10 of the mobility 1 described above and the plurality of transport robots 20 that transport the package unit 50.

Each of the plurality of transport robots 20 may be configured to be capable of autonomous driving. The top plate 21 of each transport robot may have an overall flat shape, and the top plate may act as a loading region of the package unit 50.

Each transport robot 20 may have wheels 24 provided in at least four places on the lower portion, respectively. A driving device (not illustrated) may be connected to at least one wheel. For example, the driving device may include a driving shaft, a speed reducer, and a first motor. Also, a steering device (not illustrated) may be connected to at least one wheel. For example, the steering device may include a steering shaft, a speed reducer, and a second motor.

The first motor and the second motor may be electrically connected to a control unit (not illustrated) of the transport robot 20 and, when the first motor and the second motor rotate forward and reverse, the driving shaft and the steering shaft may rotate forward and reverse, and the corresponding wheel 24 connected to the driving shaft and the steering shaft may be configured to rotate, so the transport robot may move in the desired direction.

In the transport robot 20, the traveling direction, traveling speed, turning direction, turning speed, stop position, raising and lowering, emergency stop, etc., may be controlled by the control unit. For the control of such autonomous driving, the transport robot may be equipped with a battery and various sensors (not illustrated).

For example, each transport robot 20 may include a distance alignment unit 25 that is configured to detect the distance between the transport robot and the mobility so that the transport robot 20 may minimize the distance from the cargo hold 2 of the mobility 1 to deliver or receive a cargo.

The distance alignment unit 25 may include a proximity sensor, such as an ultrasonic sensor and an electromagnetic sensor, for minimizing a gap between an edge of the top plate 21 of the transport robot 20 and the mobility in the width direction Y of the mobility 1.

Until the proximity sensor of the distance alignment unit 25 detects the mobility 1, the transport robot 20 may be configured to move in the width direction Y of the mobility.

In addition, each transport robot 20 may include a positioning unit 26 that recognizes the position of the transport robot with respect to the cargo hold so that the transport robot 20 may align the top plate 21 of the transport robot and the cargo hold 2 of the mobility 1 to deliver or receive a cargo.

The positioning unit 26 may include a position sensor, such as an image sensor, an optical sensor, and a magnetic sensor, for aligning the positions of the transport robot 20 and the cargo hold 2 in the longitudinal direction X of the mobility.

The reaction member 19 for detecting by the position sensor may be attached to or mounted on the side surface of mobility 1. Such a reaction member may be a variety of members depending on the shape and specifications of the position sensor.

For example, since each reaction member 19 includes identification information, the positioning unit 26 of each transport robot 20 may be configured to recognize only the corresponding reaction member and align the transport robot in place with respect to the cargo hold 2.

After the transport robot 20 moves near the cargo hold 2 of the mobility 1, the transport robot may be configured to move in the longitudinal direction X of the mobility until the positioning unit 26 detects the corresponding reaction member 19 of the mobility.

The distance alignment unit 25 and the positioning unit 26 may be configured to transmit a detection signal to the control unit. Accordingly, the control unit may be configured to prevent the transport robot 20 from moving in the corresponding direction, thereby minimizing the distance between the top plate 21 of the transport robot and the cargo hold 2 and aligning the position.

In addition, the transport robot 20 may include a plurality of elevators 27 configured to raise the transport robot from the ground and lower the transport robot back to the ground for the height alignment with one end of the loading plate 10 in the cargo hold 2.

The plurality of elevators 27 may be arranged to operate without interfering with the wheels 24 on the bottom surface of the transport robot 20. For example, a hydraulic cylinder, an electric actuator, or the like, having an operation rod 28 may be employed as such an elevator.

In order to control the operation of the elevator 27, the sensor unit 29 may be installed at the edge of the top plate 21 of the transport robot 20, and the reaction member 19 may be attached to or mounted on the end portion of the loading plate 10.

Meanwhile, instead of the elevator 27, the transport robot 20 may include a base portion 38, a top plate 21 that may be raised and lowered on the base portion, and a lifter 37 that is interposed between the base portion and the top plate to raise and lower the top plate.

As the lifter 37, for example, a pantograph may be employed, but the configuration of the lifter is not necessarily limited thereto. In addition, when the pantograph type lifter is used, a third motor (not illustrated) for driving the pantograph may be installed on the base portion 38.

The third motor may be electrically connected to the control unit together with the first motor and the second motor. When the third motor rotates forward and reverse, the pantograph type lifter 37 may be expanded or contracted, so the top plate 21 of the transport robot 20 may be raised to a desired height and lowered to the base portion 38.

In addition, in order to control the operation and the rising height of the elevator 37, the sensor unit 29 may be installed at the edge of the top plate 21 of the transport robot 20, and the reaction member 19 may be attached to or mounted on the end portion of the loading plate 10.

For example, after the transport robot 20 arrives near the cargo hold 2, when the elevator 27 or the lifter 37 operates to raise the top plate 21 of the transport robot, the sensor unit 29 of the transport robot may be configured to detect the magnetic field or light from the corresponding reaction member 19 of the loading plate 10, and transmit the detection signal to the control unit of the transport robot. Accordingly, by stopping the operation of the elevator or the lifter by the control unit, the height alignment between the top plate of the transport robot and one end of the loading plate may be achieved.

Each transport robot 20 may include a pusher that is installed on the top plate 21 and may be configured to move the package unit to the loading plate 10 in the cargo hold 2 by pushing the package unit 50 placed on the top plate.

The pusher 30 may include a pusher head 31 having one side in direct contact with the package unit 50 and a pusher driver 32 connected to the other side of the pusher head to provide a driving force.

Since at least one side surface of the pusher head 31 is formed as a flat surface, the flat surface may directly and stably contact the package unit 50. The flat surface may be provided with a cushioning material 33 made of an elastic material such as rubber or resin.

For example, the hydraulic cylinder, the electric actuator, or the like, having an operation rod 34 may be employed as the pusher driver 32. The pusher driver may be installed on the top plate 21 together with the pusher head 31, and may be configured to be raised and lowered on the top plate in the same manner according to the raising and lowering of the top plate.

Optionally, a stopper 35 that controls the operation of the pusher 30 may be installed on the top plate 21. As the stopper, the hydraulic cylinder, such as the pneumatic cylinder, that has an operation rod 36, the electric actuator, such as the solenoid actuator, that has an operation rod, and the like may be employed.

The apparatus for loading and unloading a cargo of the present disclosure configured as described above may automatically load a plurality of cargoes from the transport robots 20 to the cargo hold 2 of mobility 1 without the aid of manpower, or unload a plurality of cargoes from the cargo hold of mobility onto the transport robots.

In the case of loading or unloading the plurality of cargoes onto and from the plurality of transport robots 20, in order to prevent the interference or collision between the robots, an operation start position and/or operation start time of each transport robot may be operated differently from each other.

After the transport robot 20 arrives near the cargo hold 2 and is distance-aligned and positioned, the control unit of the transport robot may be configured to operate the elevator 27 or the lifter 37 as needed to achieve the height alignment between the top plate 21 of the transport robot and the tilted loading plate 10 of the cargo hold.

When loading the cargo, the pusher 30 may be configured to push the package unit 50 placed on the top plate 21 to move the package unit to the loading plate 10 in the cargo hold 2.

The package unit 50 may be configured to slide down the tilted loading plate 10 by the weight of the cargo and its own weight.

Due to the plurality of ball transfers 54, the package unit 50 may be configured to slide smoothly due to the reduced frictional force when moving on the loading plate 10 or on the top plate 21 of the transport robot 20.

Due to the kinetic energy coming down from the tilted loading plate 10, when loading the cargo, the package unit 50 may be configured to reach the other end of the guide 14 formed on each loading plate and stop moving and, when unloading, reach the pusher 30 of the transport robot 20 and stop moving.

Finally, the tilting driver 11 may be configured to operate in the cargo hold 2 to keep the loading plate 10 horizontal and transport the plurality of cargoes to the desired destination.

As such, in the apparatus for loading and unloading a cargo of the present disclosure, it is possible to automatically load or unload a larger number of cargoes simultaneously by applying the plurality of loading plates 10 and the plurality of transport robots 20.

As set forth above, according to an exemplary embodiment in the present disclosure, it is possible to improve convenience and efficiency of loading and unloading work by automatically loading and unloading cargoes in a mobility.

In addition, according to an exemplary embodiment in the present disclosure, it is possible to increase safety and reliability in transportation of cargoes using a mobility such as an aircraft by automatically fixing the cargoes during the loading of the cargoes.

The spirit of the present disclosure has been illustratively described hereinabove. It will be appreciated by those skilled in the art that various modifications and alterations may be made without departing from the essential characteristics of the present disclosure.

Accordingly, exemplary embodiments disclosed in the present disclosure and the drawings are not to limit the spirit of the present disclosure, but are to describe the spirit of the present disclosure. The scope of the present disclosure is not limited to these exemplary embodiments. The scope of the present disclosure should be interpreted by the following claims, and it should be interpreted that all the spirits equivalent to the following claims fall within the scope of the present disclosure.

What is claimed is:

1. A mobility, comprising:
   a cargo hold that accommodates a cargo;
   a loading plate positioned to be spaced apart from a bottom of the cargo hold and installed so as to be configured to tilt toward any one side of the mobility in the cargo hold;
   a plurality of guides formed on an upper surface of the loading plate and configured to:
   support a package unit on which the cargo is placed; and
   guide the package unit to move in a width direction of the loading plate;
   an inclined surface provided on at least one side surface of each guide of the plurality of guides and inclined with respect to width direction of the loading plate; and
   a groove portion widened toward a door of the cargo hold and gradually narrowed on an opposite side, wherein the groove portion is formed between the plurality of guides, adjacent to each other by the inclined surface.

2. The mobility of claim 1, further comprising at least one tilting driver configured to tilt the loading plate,
   wherein the at least one tilting driver is installed between the loading plate and the bottom of the cargo hold.

3. The mobility of claim 2, further comprising:
   a pivoting member, configured to extend in a height direction of the cargo hold, installed below a center of the loading plate in a width direction, wherein the loading plate is tilted about the pivoting member; or a rotation shaft extending in a longitudinal direction of the cargo hold, installed below the center of the loading plate in the width direction, wherein the loading plate is tilted about the rotation shaft.

4. The mobility of claim 1, wherein the package unit comprises:
   a container accommodating the cargo; or
   a tray on which the cargo is fixedly placed,
   wherein the package unit is standardized.

5. The mobility of claim 1, further comprising a plurality of guide grooves, formed on a bottom surface of the package unit, configured to:
   accommodate a guide of the loading plate, of the plurality of guides; and
   guide the package unit to linearly move along the guide on the loading plate.

6. The mobility of claim 5, wherein the bottom surface of the package unit comprises at least one protrusion formed and configured to be insertable between a pair of adjacent guides, wherein:
the protrusion, or an extension extending from the protrusion, is provided with a fastening hole, and
the fastening hole is fastened with an operation rod of a fastener installed on at least one of the pair of guides of the plurality of guides.

7. The mobility of claim 1, further comprising a plurality of ball transfers at least partially mounted on a bottom surface of the package unit.

8. The mobility of claim 1, wherein the loading plate comprises a plurality of loading plates in the cargo hold, wherein:
the plurality of loading plates are arranged in two rows in the cargo hold, and
the cargo hold is approached from both sides of the mobility in a width direction.

9. An apparatus for loading and unloading a cargo, comprising:
a loading plate of a mobility, the loading plate positioned to be spaced apart from a bottom of a cargo hold of the mobility that accommodates a cargo and installed so as to be configured to tilt towards any one side of the mobility in the cargo hold,
a transport robot, configured to be travelable, comprising a pusher configured to push the cargo, positioned on a top plate of the transport robot, to the loading plate;
a plurality of guide rails, formed on the top plate of the transport robot and configured to:
support a package unit on which the cargo is placed; and
guide the package unit to move in a longitudinal direction of the transport robot;
wherein, at one end portion of each guide rail of the plurality of guide rails, an inclined surface is formed on at least one side surface of the guide rail, and a region between the inclined surfaces is formed to be widened toward the cargo hold and gradually narrowed on an opposite side.

10. The apparatus of claim 9, further comprising a plurality of guide grooves formed on a bottom surface of the package unit, configured to guide the package unit to linearly move on the loading plate and the top plate of the transport robot.

11. An apparatus for loading and unloading a cargo, comprising:
a loading plate of a mobility, the loading plate positioned to be spaced apart from a bottom of a cargo hold of the mobility that accommodates a cargo and installed so as to be configured to tilt towards any one side of the mobility in the cargo hold;
a transport robot, configured to be travelable, comprising:
a pusher configured to push the cargo, positioned on a top plate of the transport robot, to the loading plate; and
a distance alignment unit configured to sense a distance between the transport robot and the mobility to reduce a distance from the cargo hold to a minimum distance;
wherein the transport robot is configured to move in a width direction of the mobility until a proximity sensor of the distance alignment unit detects the mobility.

12. The apparatus of claim 9, wherein:
the transport robot further comprises a positioning unit configured to align a position of the transport robot with respect to the cargo hold so that the top plate of the transport robot and the cargo hold are aligned,
a side surface of the mobility comprises a reaction member for position detection, and
the transport robot is configured to move along a longitudinal direction of the mobility until a position sensor of the positioning unit detects the reaction member.

13. An apparatus for loading and unloading a cargo, comprising:
a loading plate of a mobility, the loading plate positioned to be spaced apart from a bottom of a cargo hold of the mobility that accommodates a cargo and installed so as to be configured to tilt towards any one side of the mobility in the cargo hold;
a transport robot, configured to be travelable, comprising:
a pusher configured to push the cargo, positioned on a top plate of the transport robot, to the loading plate; and
a plurality of elevators configured to raise and lower the transport robot for height alignment with one end of the loading plate, wherein each elevator comprises an expandable operation rod,
a sensor unit is installed at an edge of the top plate; and
a reaction member mounted at one end of the loading plate;
wherein, when the transport robot is raised and lowered by an operation of the elevator, if the sensor unit detects the reaction member, the elevator is configured to stop the operation of the elevator.

14. An apparatus for loading and unloading a cargo, comprising:
a loading plate of a mobility, the loading plate positioned to be spaced apart from a bottom of a cargo hold of the mobility that accommodates a cargo and installed so as to be configured to tilt towards any one side of the mobility in the cargo hold, and
a transport robot, configured to be travelable, comprising a pusher configured to push the cargo, positioned on a top plate of the transport robot, to the loading plate;
wherein the pusher comprises:
a pusher head, wherein one side of the pusher head is in direct contact with a package unit on which the cargo is placed; and
a pusher driver, connected to another side of the pusher head, configured to provide a driving force;
wherein the one side of the pusher head is provided with a cushioning material formed of an elastic material.

15. An apparatus for loading and unloading a cargo, comprising:
a loading plate of a mobility, the loading plate position to be spaced apart from a bottom of a cargo hold of the mobility that accommodates a cargo and installed so as to be configured to tilt towards any one side of the mobility in the cargo hold;
a transport robot configured to be travelable, comprising a pusher configured to push the cargo, positioned on a top plate of the transport robot, to the loading plate; and
a stopper on the top plate, configured to control an operation of the pusher.

16. The apparatus of claim 9, wherein the transport robot comprises:
a base portion;
the top plate that is configured to be raised and lowered on the base portion; and
a lifter that is interposed between the base portion and the top plate, configured to raise and lower the top plate.

17. The apparatus of claim 16, further comprising:
a sensor unit installed at an edge of the top plate; and
a reaction member mounted at one end of the loading plate,
wherein the apparatus is configured such that, when the top plate is raised by an operation of the lifter, if the sensor unit detects the reaction member, the lifter is configured to stop the operation of the lifter.

18. The apparatus of claim 9, wherein:
the loading plate comprises a plurality of loading plates in the cargo hold,
the transport robot comprises a plurality of transport robots, and
the plurality of transport robots have different operation start positions or operation start times.

* * * * *